United States Patent [19]
Callahan, Jr.

[11] Patent Number: 5,165,218
[45] Date of Patent: Nov. 24, 1992

[54] AUTOMATIC SORTING, STACKING AND PACKAGING APPARATUS AND METHOD

[76] Inventor: Bernard C. Callahan, Jr., 2420 Garrett Rd., Drexel Hill, Pa. 19026

[21] Appl. No.: 718,205

[22] Filed: Jun. 20, 1991

[51] Int. Cl.⁵ .............................. B65B 35/50
[52] U.S. Cl. .............................. 53/447; 53/54; 53/243; 53/499; 53/537; 53/540
[58] Field of Search .............. 53/54, 242, 243, 244, 53/245, 254, 443, 447, 448, 475, 499, 531, 532, 537, 540

[56] References Cited

U.S. PATENT DOCUMENTS

| | | | |
|---|---|---|---|
| 2,713,959 | 7/1955 | Gilbert et al. | 53/540 |
| 2,869,297 | 1/1959 | Neer | 53/448 |
| 3,619,967 | 11/1971 | Alduk | 53/448 |
| 3,713,266 | 1/1973 | Crow, Jr. et al. | 53/447 |
| 3,783,577 | 1/1974 | Knutson et al. | 53/448 X |
| 3,791,099 | 2/1974 | Wagner | 53/447 |
| 3,820,301 | 6/1974 | Willsex | 53/499 |
| 4,236,855 | 12/1980 | Wagner et al. | 53/540 X |
| 4,530,435 | 7/1985 | Stohlquist | 53/54 X |
| 4,546,594 | 10/1985 | Mohaupt | 53/243 X |
| 4,662,152 | 5/1987 | Simelunas et al. | 53/254 X |

FOREIGN PATENT DOCUMENTS

| | | | |
|---|---|---|---|
| 129543 | 1/1978 | Fed. Rep. of Germany | 53/54 |
| 127206 | 5/1990 | Japan | 53/243 |

*Primary Examiner*—John Sipos
*Assistant Examiner*—Daniel Moon
*Attorney, Agent, or Firm*—Frank J. Benasutti

[57] ABSTRACT

An apparatus and method are disclosed for continuously accumulating, screening, stacking and packaging disks such as hamburger patties automatically and without the use of personnel in contact with the patties. This includes weighing the patties by optical comparison means so that the finished package is within the tolerances permitted for weight of goods.

17 Claims, 16 Drawing Sheets 5,165,218

AUTOMATIC SORTING, STACKING AND PACKAGING APPARATUS AND METHOD

FIELD OF THE INVENTION

This invention relates to automated machinery for sorting, stacking and packaging flat disc-like objects, particularly for the processed food industry items such as frozen meat patties.

BACKGROUND OF THE INVENTION

Flat disc-like food items, such as frozen hamburger patties, are often sold in packaged stacks for both home and commercial use. Commercial sized packages normally contain a greater quantity; for example, a 144 patty package stacked in 12 layers of 12 patties (4×3 in each layer) is a common configuration of hamburger packaging for fast food restaurants.

Other flat disc-like food items include any variety of formed meat or poultry patties, slices of cylindrical sausages or luncheon meats, cookies and candies.

In the case of dry-frozen hamburger patties, these patties are formed and dry-frozen by well-known machinery, such as, for example, a FORMAX machine manufactured by FORMAX Food Machines, Mokena, Ill. These machines discharge frozen patties in a relatively continuous stream. The patties may then be inspected either visually and/or electronically for defects, and conveyed to a packing area.

Although some plants may still employ entirely hand-packers, most modern plants have some degree of automation intended to reduce the tasks of removing the patties from the conveyor or collecting bin, stacking them in the proper configuration in the packaging containers, sealing the containers and transporting them from the packaging area to cold storage or loading docks. For example, U.S. Pat. Nos. 4,137,604; 4,236,855; and 4,827,692 disclose apparatus for automating tasks in the stacking and packaging process.

There are a number of problems associated with this industry which relate to the quality of the product. These include metal pieces which may be found in the meat, portions of patties which are missing and overweight or underweight patties. Since present technology in the formed food packing industry consists of delivering the product down a conveyor system to a packing area where the food product is packed by hand in a slow and labor-intensive way, the handling of the end item can also lead to contamination which must be avoided where possible. Nevertheless, where high speeds are required, hand packing is still the rule.

BRIEF SUMMARY OF THE INVENTION

In the present invention, the stacking and packing design starts at the system level and permits a wide variation in product size, weight and consistency. The design allows for continuous packing of product at high production rates and eliminates the need for manual intervention. This design permits the highest speeds of present forming equipment and can handle increases in speeds over that. It is a modular, non-stop stacking and packing system for the formed food industry.

In accordance with this invention, product enters the system by means of a conveyor where a sensing grid array, measures the product volume and calculates the weight and size of the product. Product that does not meet either weight and/or size criteria is rejected, and is dropped into a rejection bin.

A metal detecting device is also used to discern metal in the product. If metal is detected, this product is also rejected into a separate bin for disposal.

Because of this weigh "on the fly" feature, achieved by using a matrix of sensing devices in all three planes, more accurate weights are achieved leading to greater savings to the customer.

The system also provides for an operator-selected sort of product into a packing matrix. A light weight form operates as a gate for selectively determining quantities and arrays of product. This form is placed on the conveyor by the operator and simply plugged in. It conforms with the number of product to be packed across the width of the box or container for the product. It can be readily changed to provide a different configuration.

An object of the present invention is to automate virtually all of the stacking and packing process in applications where it is desired to stack the disc-like patties into a container holding a stack configuration of H layers of discs, each layer having W columns and D rows of discs (wherein H, W and D are integers). That is, to receive the stream of patties from the former/freezer, inspect and reject defective patties, count and assemble the patties into the desired $H \times W \times D$ stack configuration, deposit the stack into the packaging container, close and seal the container and convey it to a loading dock or cold storage chamber without manual labor. These tasks are accomplished in the apparatus described herein. The invention also encompasses abbreviated forms in which only the assembly of patties into the desired $H \times W \times D$ stack configuration and the deposit of the stack into the packaging container are automated, and within inspection and rejection of defects and/or the closing, sealing and transport of the filled containers may be accomplished manually.

Accordingly, in its basic form, the apparatus described herein comprises a conveyor for carrying the patties from the former/freezer, a layer-forming gate to arrest and accumulate patties into uniformly spaced layers of W columns across and D rows along the conveyor and release each layer when it is complete to be conveyed to one or more staking shoes. Each stacking shoe comprises a bottom plate and side walls having the approximate dimensions and shape of the interior of the containers except for an open side oriented toward the end of the conveyor. A reciprocating means moves the shoe toward the conveyor such that the conveyer end enters the shoe and overlies its bottom plate adjacent the rear wall, and withdraws the shoe from conveyer at a rate commensurate with the rate of movement of patties from the conveyor, so that each layer is deposited into the shoe in substantially the same spacing created by the forming gate. A vertical indexing means lowers the shoe in relation to the conveyor in increments commensurate with the thickness of the patties after each reciprocation cycle, causing each layer after the first to be discharged directly on top of the immediately preceding layer.

When H number of layers are stacked in the shoe, a packaging means lowers an open-ended container over the shoe. An inverting means then inverts the shoe and container to deposit the stack into the container, and then withdraws the shoe from the container and returns it to its orientation toward the discharge end of the conveyor.

Often, the box may contain a plastic liner. In such a situation, the liner is placed in the open box, and then the box and liner are spread to receive the shoe. One means of doing this is with a vacuum assist means. In a normal box, the flaps are folded and glued at the bottom. This allows for a small space or hole through the bottom. Since the plastic liner is placed in it, and the box and liner are ultimately inverted to fit over the shoe, a vacuum may be applied to the hole in order to draw the liner down against the bottom of the box and retain it.

Vacuums may also be used to maintain box geometry for ease of loading. In this regard, a vacuum may be applied to the outside of the box walls for this purpose.

The box (now filled with product) is discharged to a take-away conveyor and through a check weigher to confirm proper weight. Because of the volume and area measurement of each product and a comparison of the information as to density stored in the system memory, which has, by this time, led to the rejection of unsatisfactory product, addition or subtraction of product in the box is not necessary. Accordingly, the filled containers may be automatically closed and sealed and conveyed to a loading dock or cold storage area.

Where two or more stacking shoes are fed by the conveyor, the conveyor divides from a common path to alternate conveyor paths, and a means is provided for alternately directing patties from the common path to one of the alternate paths at time periods such that the patties' arrival at the shoe is coordinated with the shoe's return to begin receiving the patties.

BRIEF DESCRIPTION OF THE DRAWINGS

FIG. 1b is an elevation of the module shown in FIG. 1a;

FIG. 5b is a side elevation of the device shown in FIG. 5a;

FIG. 5c is a section taken as indicated by the lines and arrows 6—6 in FIG. 5a;

FIG. 5d is a front elevation of a portion of the apparatus as taken as indicated by the lines and arrows 5—5 in FIG. 5a;

FIG. 7a is a perspective view of a stacking shoe shown in FIG. 7;

DETAILED DESCRIPTION OF THE PREFERRED EMBODIMENT

Figure 1:
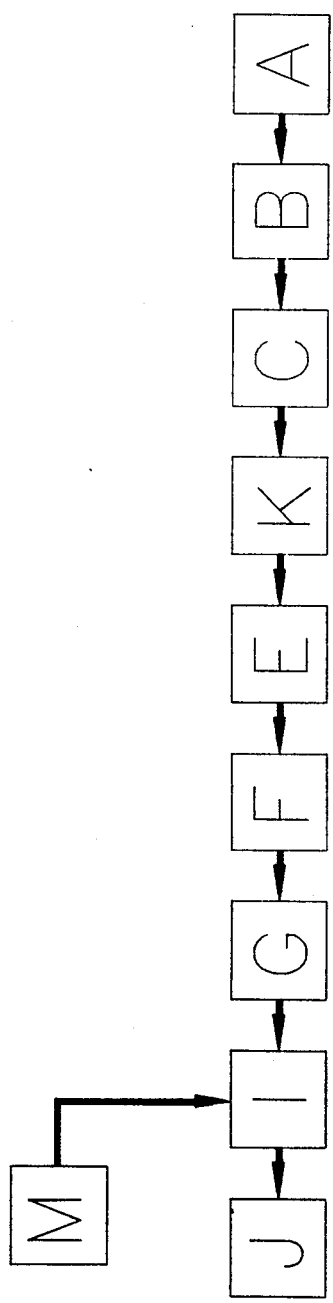
FIG. 1 is a block diagram showing the modules making up the apparatus and the process of this invention.

Referring to the figures, FIG. 1 shows a block diagram of the modular elements of the machinery and the process steps of this invention in its preferred embodiment. In accordance with the system for use in processing frozen hamburger patties, a machine for producing these patties is shown at A. This machine is designed to produce the patties of a given size and shape from a material of a known density. The frozen patties are then conveyed as shown by the directional arrow along a belt through a metal detector B. This machine is designed to detect metal in the meat and, in accordance with my invention, the detected patty is identified for selective rejection at Station K. However, at this stage, the patty proceeds to Station C where an imaging device, comprising a sensor assembly means, measures the area and volume and, using the known density of the product, calculates its weight. The sensor array measures the length, width and thickness of the product. A preselected tolerance band is used for making a decision to accept or reject a product.

Figure 1A:
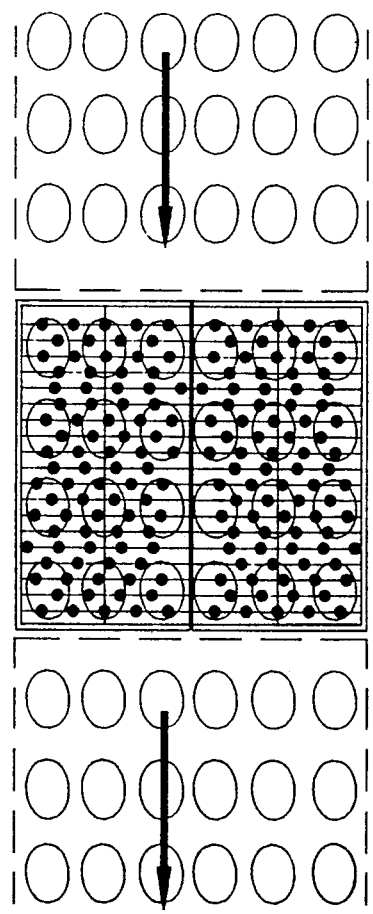
FIG. 1a is a schematic, shown in plan view of a sensing module of the present invention.
Figure 1B:
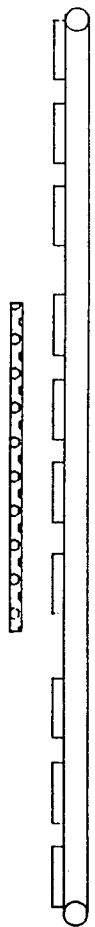

A portion of the sensor assembly means is shown in plan and elevation views in FIGS. 1a and 1b respectively. By this means, patties which do not measure up to standards within tolerances are also identified.

The next stage is at K wherein a diverter conveyor drops the patties onto a deflector. The deflector can deflect those patties which contain impurities such as metals into one container and those patties which are simply under or over sized into another container. Patties which are going to be continuously processed move to Station E wherein they are accumulated and thence to Station F where they are formed into arrays by virtue of a forming gate.

They next proceed to Station G wherein they are stacked in a uniform manner within a shoe.

As they are being stacked, Station M is receiving an open cardboard box, and in some instances, a plastic liner. Station M may also include vacuum means to hold a box in its shape and to retain the liner while the box is being inverted. Station M may also include mechanical means, such as retractable fingers for accomplishing these same ends. The box is then inverted as shown by the directional arrow and, through relative movement of the box and the shoe, the contents of the shoe are inserted into the box at Station I. The box and shoe are then inverted, the shoe is then withdrawn, and the box proceeds to Station J where it is sealed.

Figure 2:
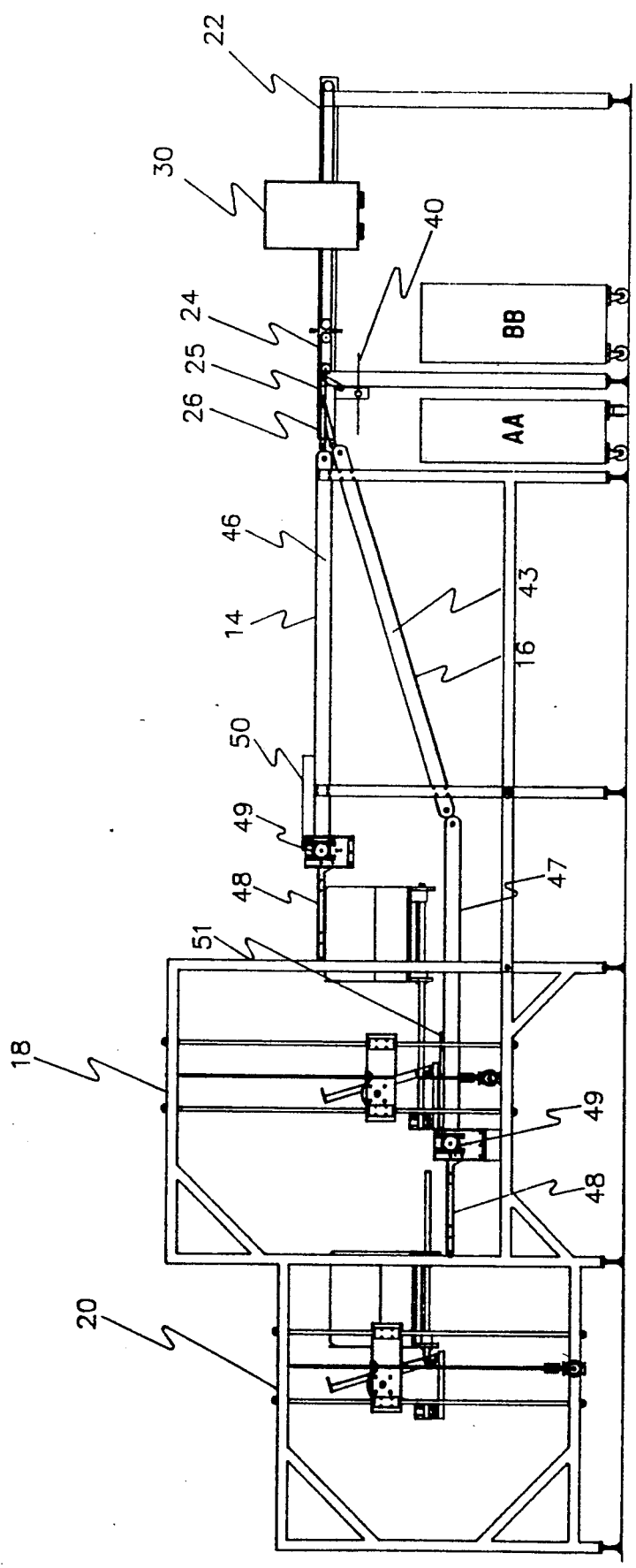
FIG. 2 is an elevation of a portion of the apparatus showing various modular stations.
Figure 2A:
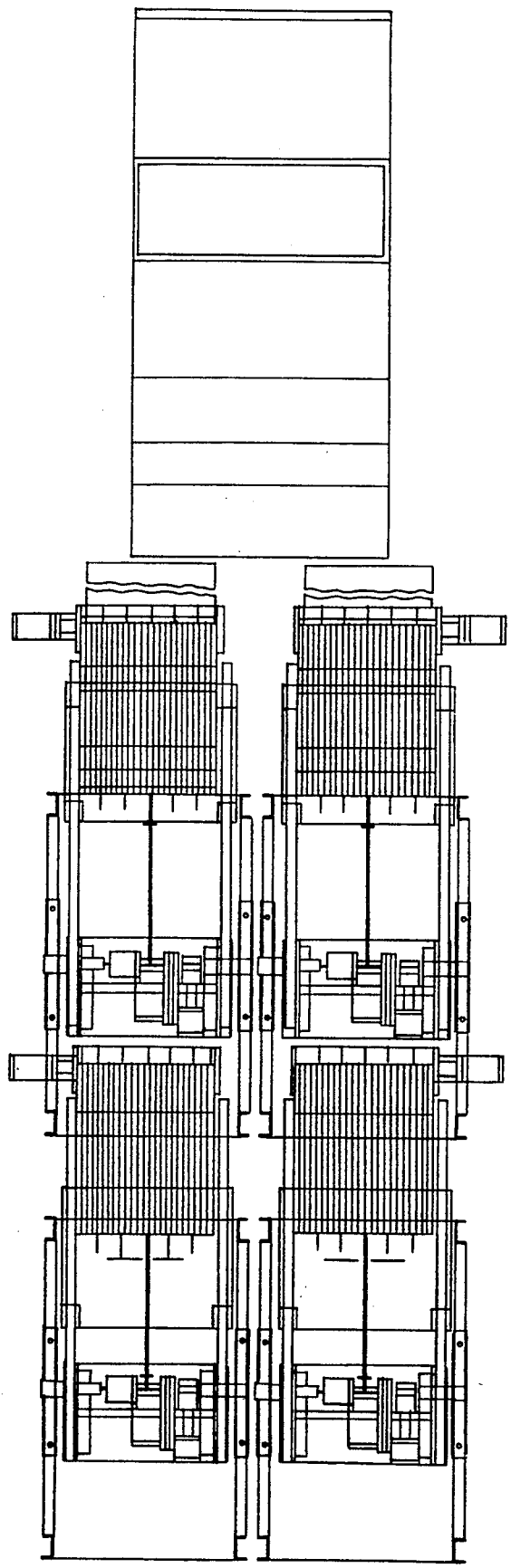
FIG. 2a is a top plan view of the apparatus shown schematically in FIG. 2.

FIG. 2 depicts an automatic sorting, stacking and packaging apparatus 10, configured to receive dry-frozen hamburger patties from a conventional former/-freezer. In the depicted configuration, the apparatus 10 will count the patties, inspect them for size, shape and metal particles, sort out defective patties, stack them into desired H×W×D stacks (in this example 12×3×4 in each stack), and load each stack into a box container. The depicted apparatus is configured with a common conveyor path 12 dividing into two alternate conveyor paths 14,16 as described in greater detail below, with each alternate path leading to one of two stacking and packaging modules 18,20. Other configurations, such as a single path/module and four path/modules will be apparent from the following description.

The common conveyor path 12 includes sequentially a receiving belt 22, a counting/imaging belt 24, a rejection belt 25, and a diverter belt 26 for alternately diverting product flow between the two alternate path conveyors. Although the term "belt" is used in this description to indicate the discrete continuous conveyor loops which make up the primary path, the loops are preferably a plurality of parallel urethane strings spaced approximately one inch apart. Such strings are known in the prior art and are preferred because they are nonmetallic, easily washed, readily replaceable, and approved for food contact by the U.S. Department of Agriculture.

The receiving belt 22 thus comprises a plurality of the parallel urethane strings forming a belt loop around a driven roller 27 and four idler rollers 28a,b,c and d. The rollers are preferably steel shafts covered by urethane sleeves, such that the shafts may be set in bearings on the frame of the apparatus while parallel groves may be cut into the sleeves at approximately one inch centers to act as guides to retain the urethane strings in parallel spacing. A variable speed pulsed d.c. motor 29 is coupled, in any suitable manner (not shown) to drive roller 27. The speed of the belt 22 may be adapted to match the delivery rate of the particular former/freezer by setting the motor (29) speed. The arrow to the right of the receiving belt 22 indicates the direction of patties proceeding out of the former/freezer.

The belt 22 passes through a metal detector 30 which detects metal particles by magnetic means, and sends a reject signal if metal is detected. One such metal detector is a Magnetic Trap model manufactured by Eriez Magnetics of Erie, Pa.

The imaging belt 24 comprises a plurality of the parallel urethane strings, which form a short belt loop around a driven roller 32 and an idler roller 33. Roller 32 should be driven at the identical speed as roller 28b, such as by a sprocket and drive chain coupling their respective shafts, to give a constant speed of transfer from the belt 22 to and across the imaging belt 24.

An imaging device 34, preferably a row of Light Emitting Diodes (LEDs) above the belt 24 (see FIG. 1b) directed at a corresponding row of photo-electric light detectors under the belt, is used to count the patties and to inspect them for size and shape. If the LED/photo-cell type detector is used, the detectors are sampled, i.e., turned off and on, for example every 50 milliseconds, in a multiplexed sequence at regular intervals (preferably corresponding to 0.1 inch or less of belt travel) to see whether or not the light from the LED is blocked by a patty. This produces a digital bit map showing the passage of the individual patties, which is accumulated and counted in a microprocessor, and is compared to pixel images of a standard patty to identify misshapen or undersized patties.

LEDs are also used to measure thickness.

Figure 3:
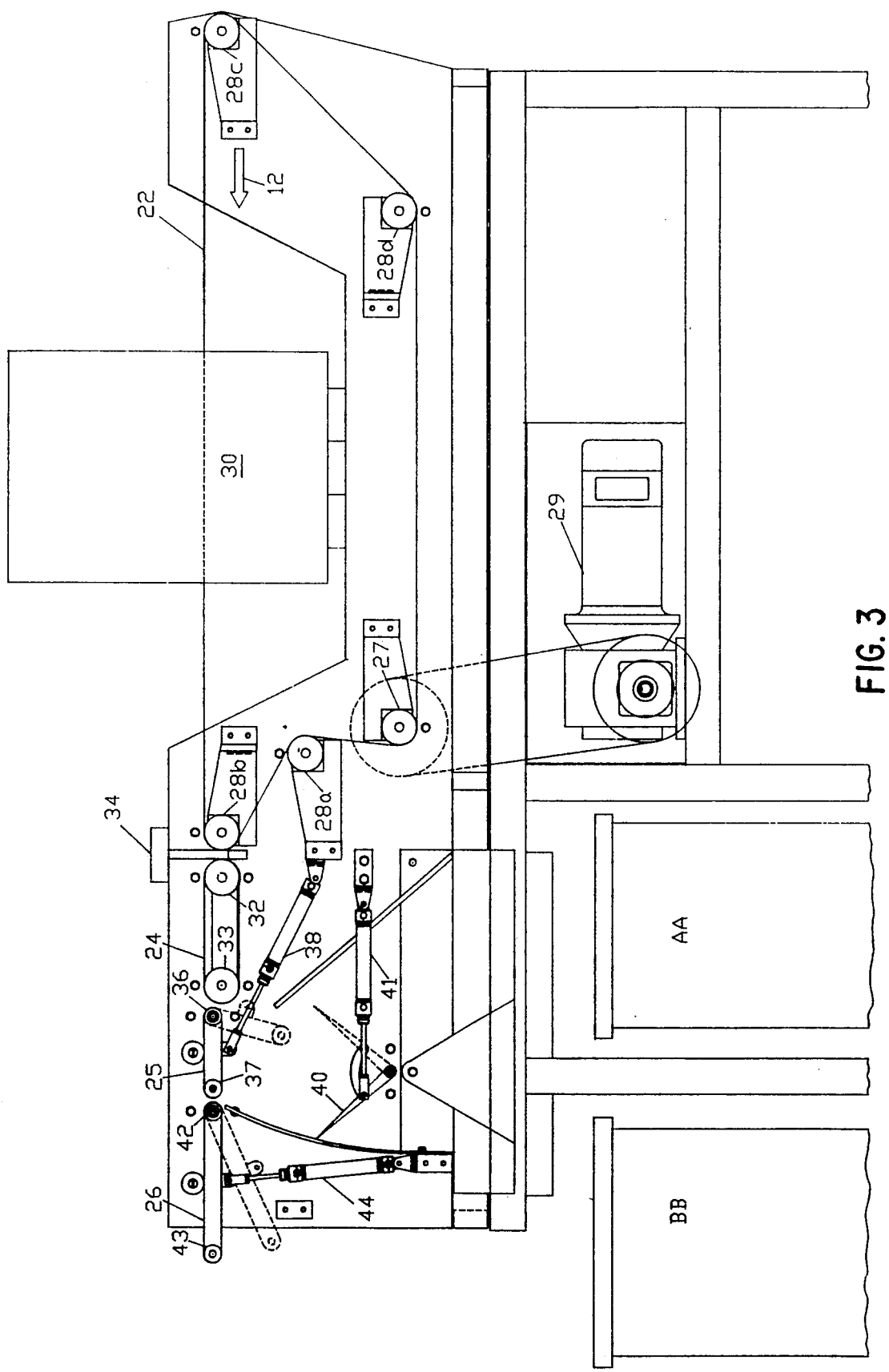
FIG. 3 is an enlargement in greater detail of a portion of the apparatus shown in FIG. 2.
Figure 4:
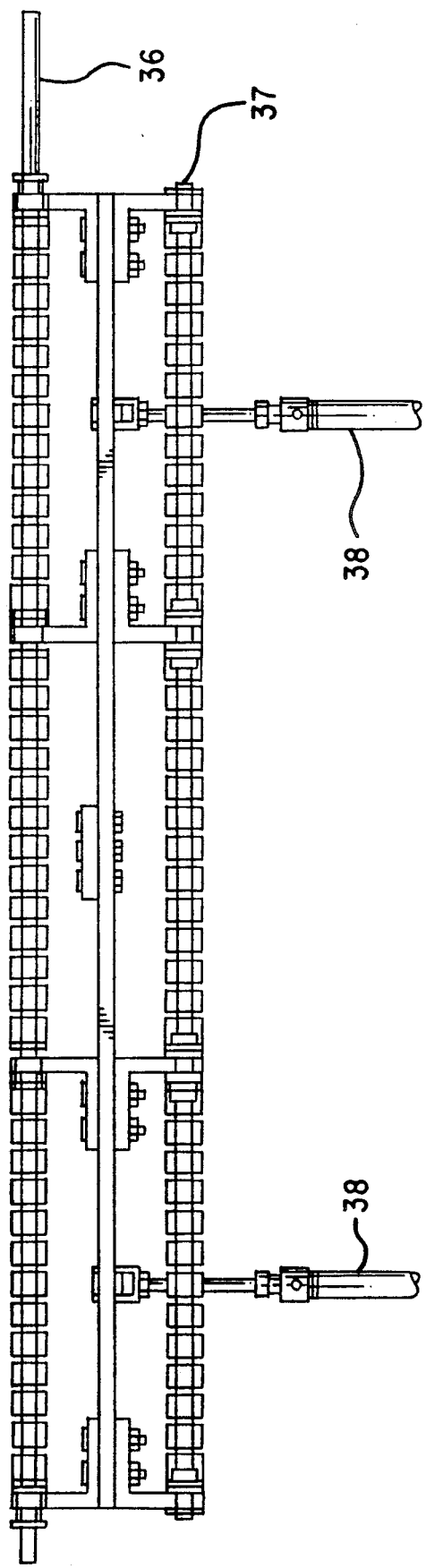
FIG. 4 is an enlargement in greater detail of a plan view of a portion of the apparatus shown in FIG. 3.

Referring to FIGS. 3 and 4, the rejector belt 25 comprises a plurality of the parallel urethane strings, which form a short belt loop around a driven roller 36 and a free roller 37. The driven roller may be driven by chain coupling to roller 33. Roller 37 is referred to as a "free" roller because its shaft ends are not journaled in the frame; instead, it is held in position by the piston rod of a pneumatic cylinder means 38. If a reject signal is generated by either the metal detector 30 or the imaging device 34, the signal is used to control (either directly or through the microprocessor) the pneumatic cylinder means 38 to retract its rod, so that the rejector belt 25 is directed downward as shown by the ghost-line position in FIG. 3. The patties are then diverted off the common path line until the reject belt is reset to its normal position. The reject signal may also be coupled back to signal operators that the product is not processing to specification, so that the cause of the defects can be identified and corrected.

A pivotable deflection plate 40 and associated pneumatic cylinder means 41 are located below the rejector belt 25. The pneumatic cylinder means 41 may receive reject signals from either the metal detector or the imaging means, or a control signal from the microprocessor causing it to retract and pivot the plate 40 into the position shown by the ghost-lines in FIG. 3. Reject bins AA and BB may be placed so that the deflection plate 40 deflects patties rejected for metal contamination into bin AA when the plate 40 is in its normal position and deflects patties rejected for size into bin BB when the plate is in another position.

The diverter belt 26 comprises a plurality of the parallel urethane strings, which form a short belt loop around a driven roller 42 and a free roller 43. The driven roller 42 may be driven by chain coupling to roller 36. Roller 43 is a "free" roller because its shaft ends are not journaled in the frame and it is held in position by the piston rod of a pneumatic cylinder means 44. The cylinder means 44 is controlled to extend or retract the rod such that the diverter belt 26 alternatingly directs discs from the common path conveyor 12 to one of the alternate path conveyors (14 or 16) for a period of time, and then directs discs from the common path to the other alternate path conveyor for an equivalent period.

The top alternate path conveyor 14 includes a belt 46 followed by a belt 48, both belts being powered by an electric motor drive 49. Belt 46, unlike the previously mentioned urethane string belts, is preferably a hinged web of ultra-high molecular weight polyethylene hinged to be pivotable in one inch segments, a web of this type being sold by Intralox, Inc. of New Orleans, La. This web is preferred because a layer-forming gate 50 is mounted on belt 46. The gate 50 is adapted to arrest and accumulate patties into uniformly spaced layers of W patty columns across the belt 46 and D patty rows along the belt 46, and to release each layer when it is complete, in a manner described in more detail below with reference to FIGS. 5 and 6. The ultra-high molecular weight polyethylene web more readily slides under the arrested patties without tearing or wearing grooves in the patties, than does the urethane strings belt.

Figure 5:
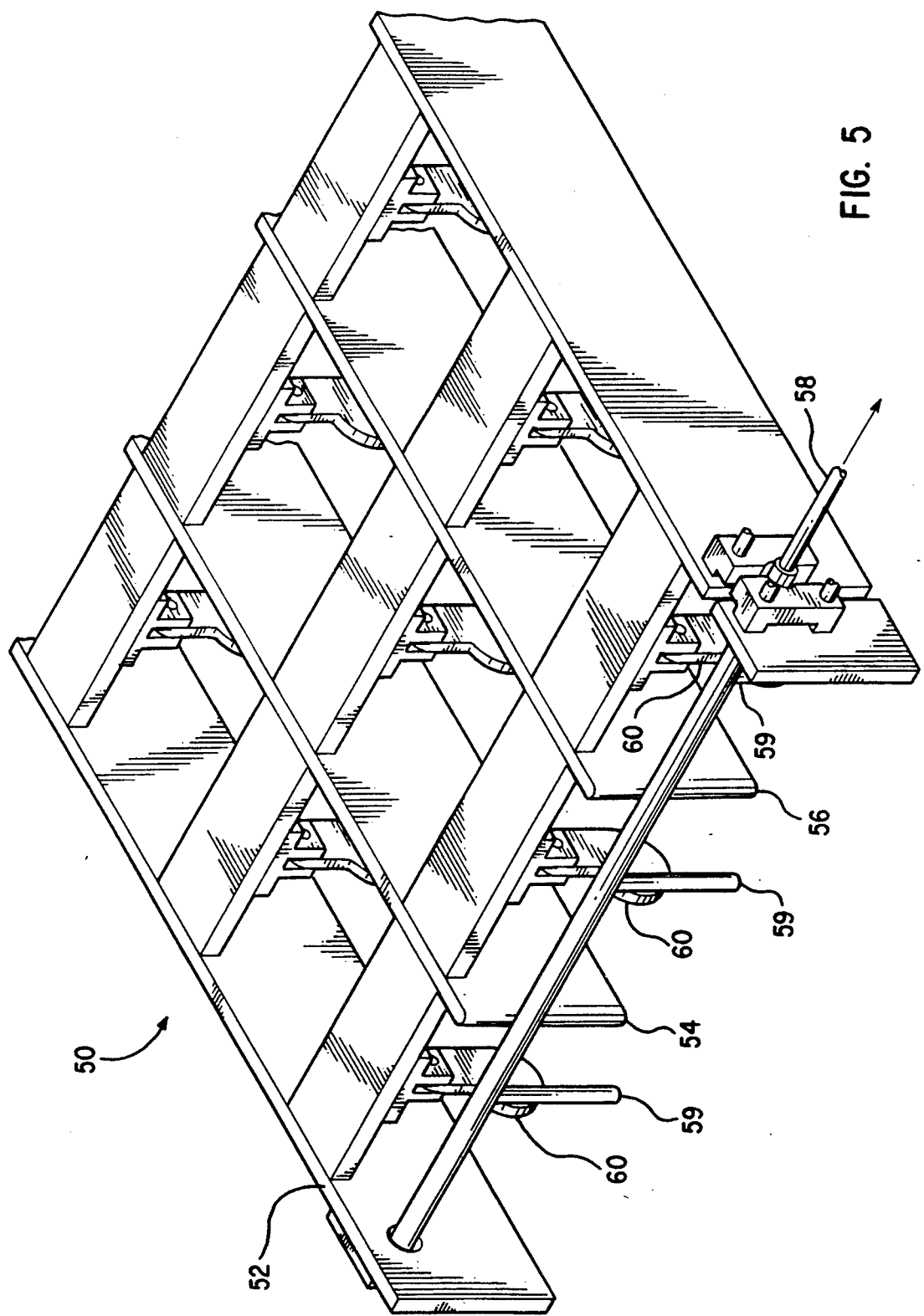
FIG. 5 is a perspective view of a forming gate which is a portion of the apparatus shown in FIG. 2.
Figure 5A:
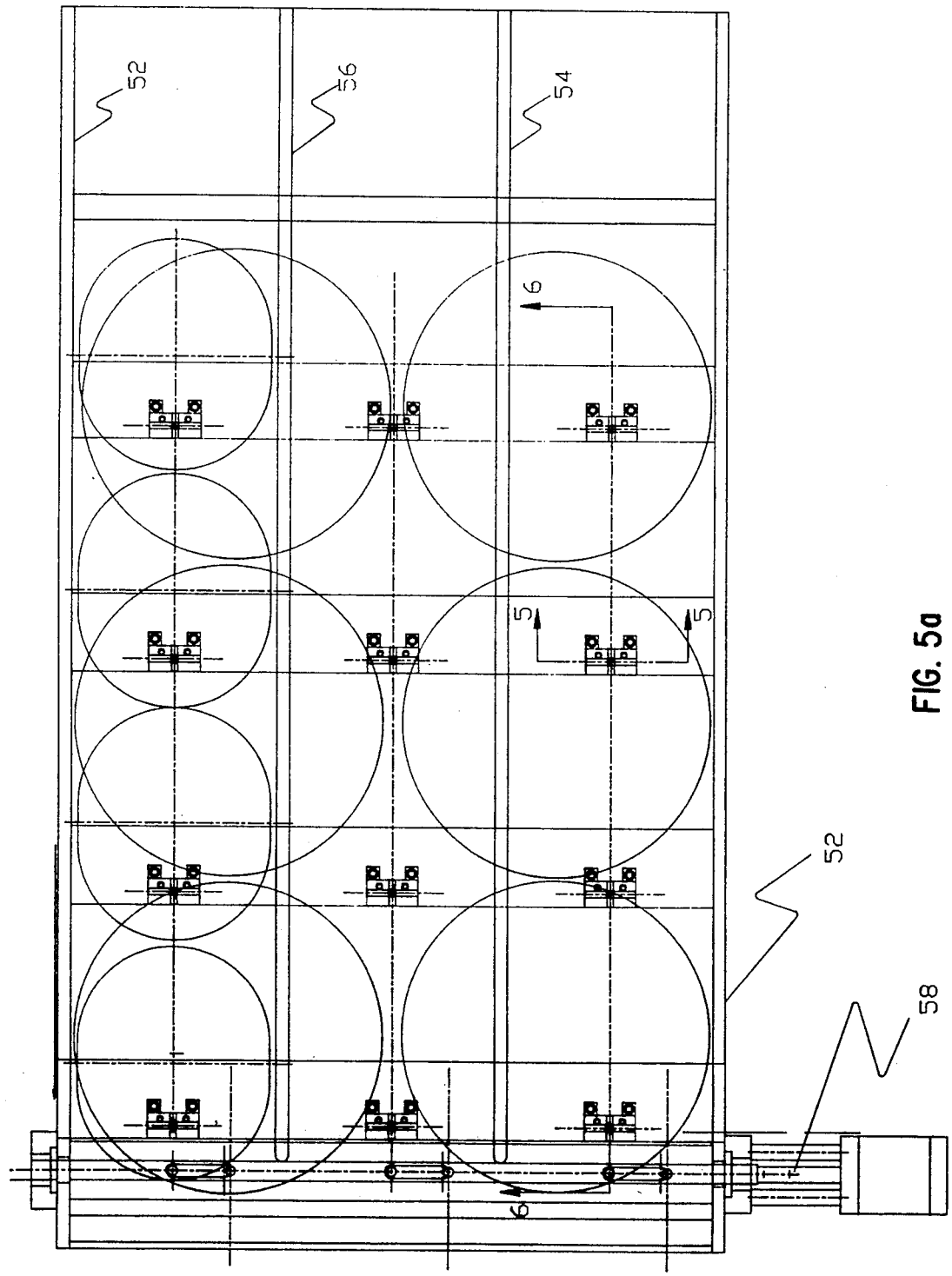
FIG. 5a is an enlarged top plan view of the gate shown in FIG. 5.
Figure 5B:
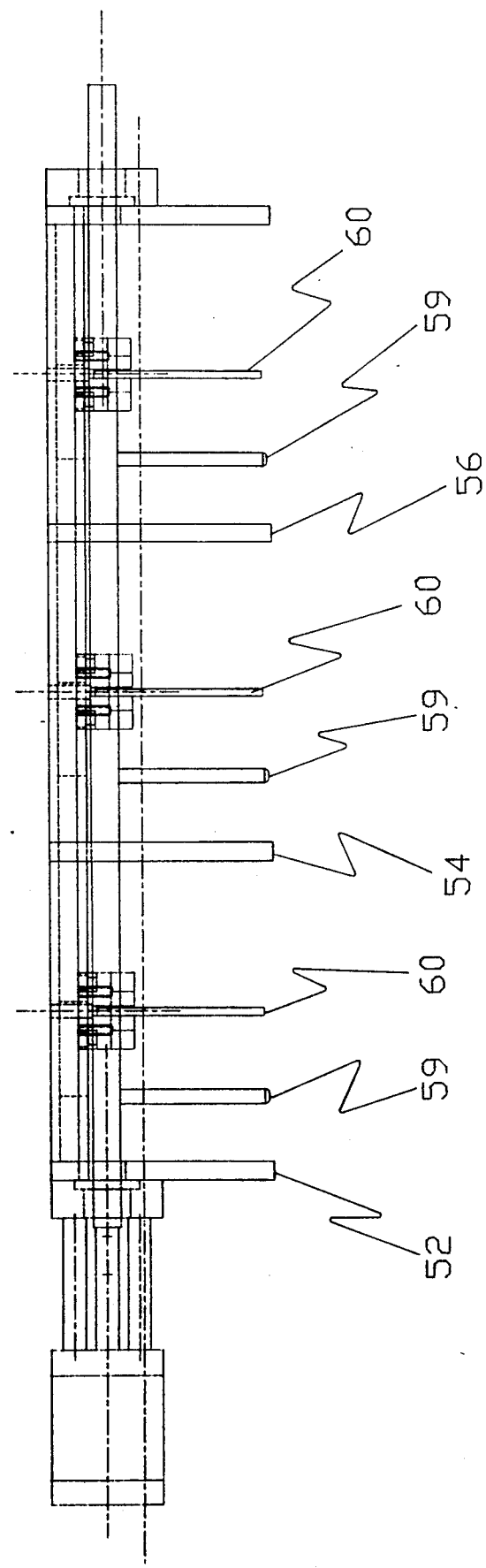
Figure 6:
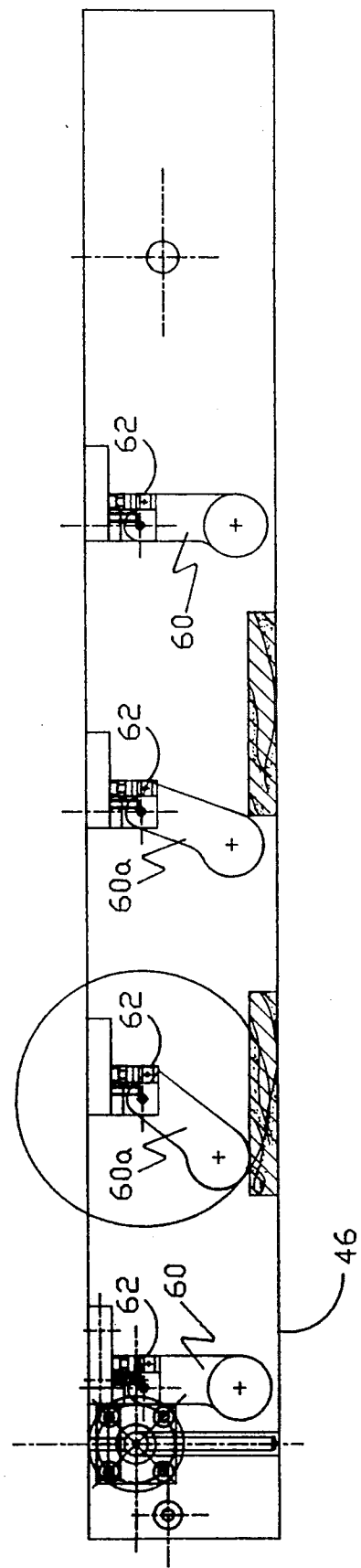
FIG. 6 is the section taken as indicated by the lines and arrows 6—6 in FIG. 5a with several of the parts reoriented from the position shown in FIG. 5c.

Referring now to FIGS. 5 and 6, the layer-forming gate 50 comprises a plastic frame 52 extending above and across the belt 46 and having two partition walls 54 which divide the patties into three (W=3) rows as they pass. In accordance with my invention, these gates can be a plurality of light-weight forms used to select formed food product in a desired matrix. One of the advantages of this invention is that this form can be readily removed by an operator and an alternate form with a different matrix placed on the belt and simply plugged in. This greatly increases the adaptability of this machinery to processing various sizes and configurations of product.

Also increasing the adaptability of this machinery is the use of varying pulley diameters to assist in forming densely packed boxes. It is within the contemplation of this invention that it may be adjustable to produce any packaging angle by adjusting the pulley diameters driving various adjacent bands; and therefore, making some go at different speeds than those adjacent to them. This changes the angle of the patty as it approaches the stacking belt.

Figure 5C:
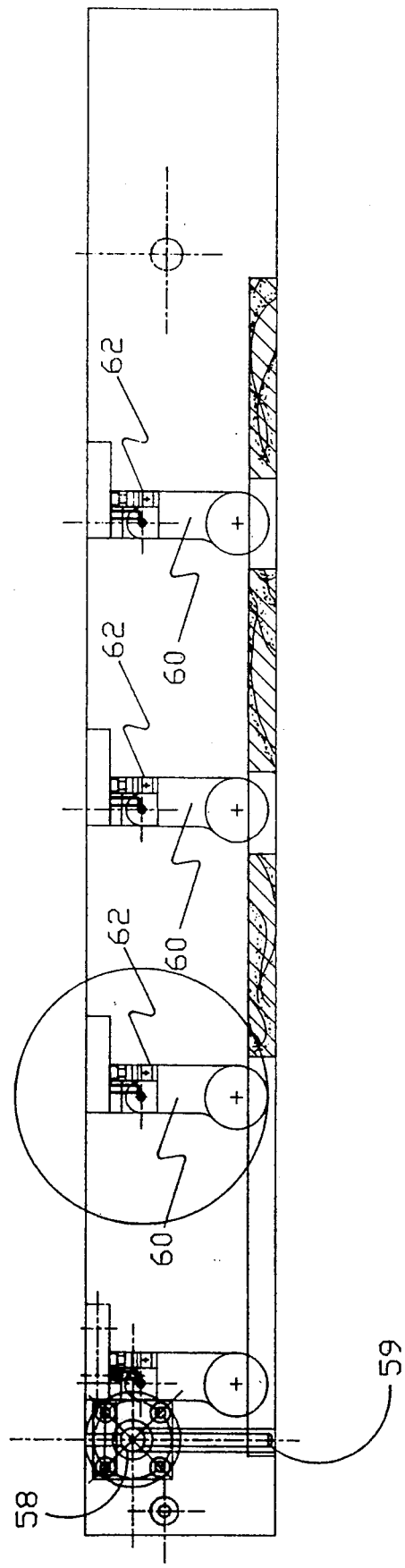
Figure 5D:
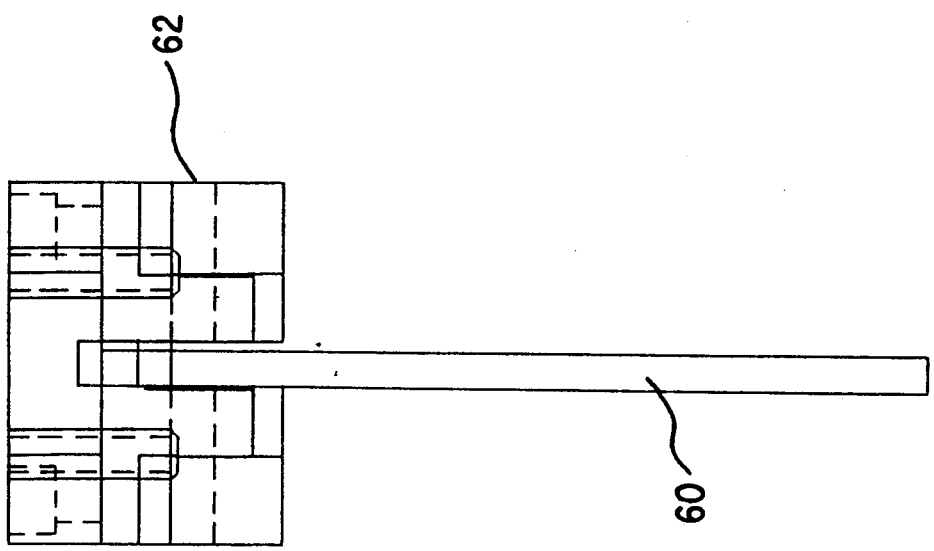

A slide bar 58 has three arresting pins 59 spaced to block the three rows, as shown in FIG. 5, to arrest and accumulate the patties entering the gate 50. Twelve pivotable fingers 60, four to each row, each depend downward from an electrical contact yoke 62 (See FIG. 5c & 5d) (preferably containing a photo-optical switch as its contact sensor) and terminate just above the belt 46. When a patty accumulates under a finger as shown by finger 60a FIG. 6, it pushes the bottom end of the finger which pivots the opposite end of the finger out of yoke 62 and breaks the electrical contact.

When all twelve contacts are open, indicating a complete 3-by-4 layer, the slide bar 58 moves (in the direction of the arrow in FIG. 5) to a position where the pins 59 are aligned with the partitions 54, and the layer of patties is released to travel along the belt 46 to the associated stacking shoe. Belt 48 may also preferably be of urethane strings as previously described.

Referring to FIG. 2, the bottom alternate path conveyor 16 is similar to the top path in the features described above, but has an additional belt 143 to run the patties at a downward angle to a level belt 47 and layer forming gate 51, corresponding to belt 46 and gate 50 above, a drive motor 49 and a short belt 48 feeding its associated stacking shoe.

Figure 7:
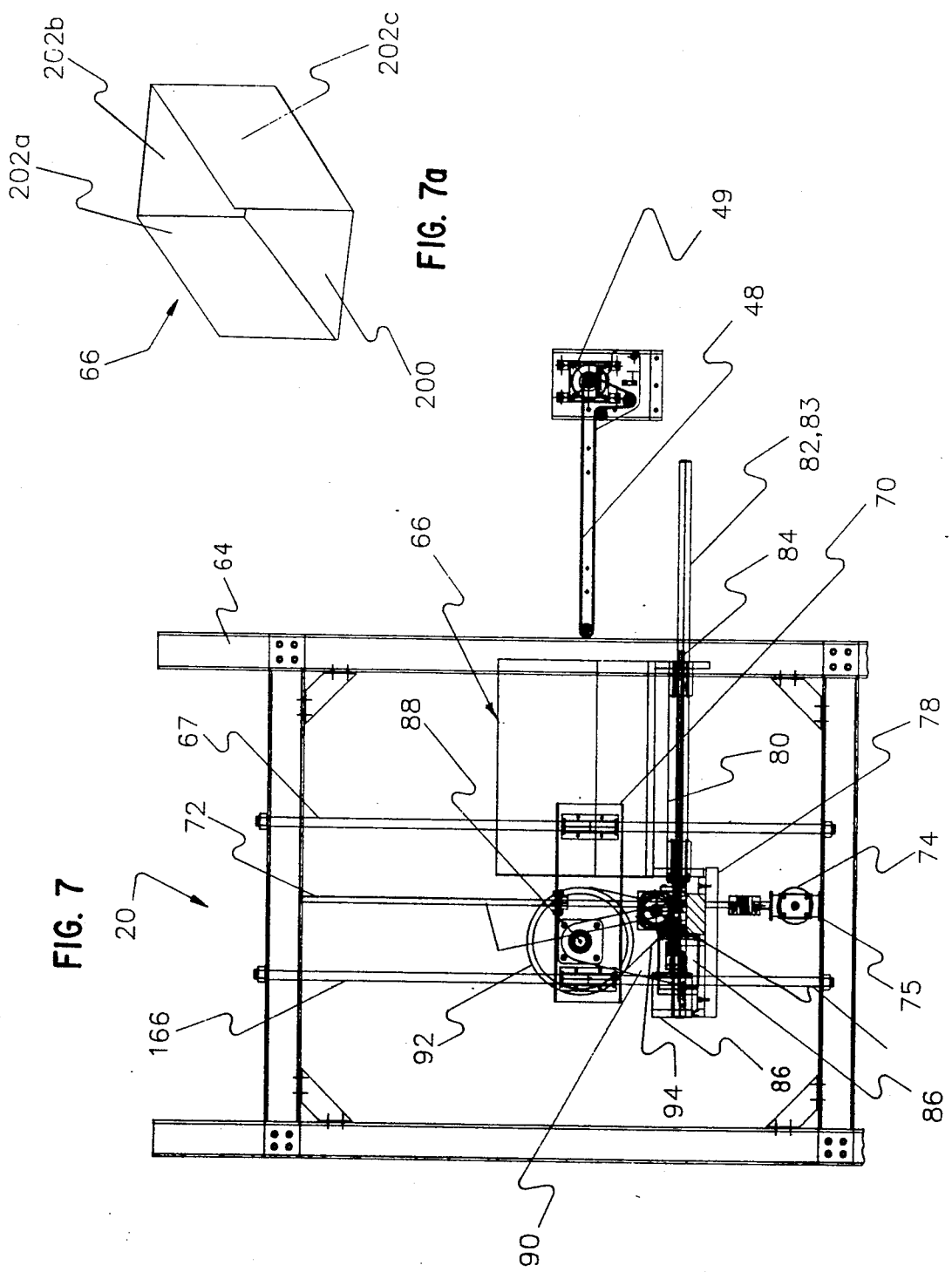
FIG. 7 is an enlarged side elevation of a portion of the apparatus shown in FIG. 2.

Referring now to FIG. 7, the stacking/packing module 20 is depicted in greater detail. The module 18 is identical in all relevant aspects depicted in FIG. 7; hence only module 20 will be described in detail and the reader will understand that there are corresponding elements in module 18.

Module 20 includes a frame 64 supporting a stacking shoe 66 and the various means for horizontally reciprocating, vertically indexing, and inverting the shoe. The stacking shoe 66 is an open-topped stainless steel structure (FIG. 7a), comprising a bottom plate 200 and three side walls 202a,b, and c having the approximate dimensions and shape of the interior of the paper box containers in which the patties will be packaged. The fourth or open side of the shoe 66 is oriented toward the discharge end of the conveyor 48 to receive the layers of patties as they are discharged from the conveyor 48.

The module 20 includes a reciprocating means to move the shoe 66 toward the discharge end of the conveyor 48 such that the downstream conveyor end enters the open side of the shoe and overlies the shoe's bottom plate 200 adjacent the back wall 202b, and to withdraw the shoe from the conveyor at a rate commensurate with the rate of movement of the patty layers, such that each layer is deposited into the shoe in substantially the same uniform 3×4 spacing as it departed the gate. It further includes a vertical indexing means to lower the shoe below the discharge end of the conveyor 48 in increments commensurate with the patty thickness after each horizontal reciprocation, such that each layer after the first is discharged directly on top of the immediately preceding layer until twelve (H=12) layers are stacked in the shoe. It further includes a means for lowering an open packing container over the filled shoe, and a means for then inverting the stacking shoe/container to invert and deposit the stacked patties in the container, and to then withdraw the shoe from the container and return it to its beginning orientation toward the discharge end of the conveyor 48. The means to achieve these various ends are described below.

The vertical indexing means comprises two pair of parallel guide rails 166,67 supporting a carriage 70, and a screw-drive shaft 72, motor 74 and right angle drive coupling 75. The carriage 70 is mounted to the rails by slide bushings that can slide vertically along the rails. The motor 74 is preferably a controllable electric motor, such as a stepper motor or servo motor which can count pulses to measure the distance moved, with its output shaft connected to the right angle drive coupling 75, which in turn rotates the screw-drive shaft 72. The carriage 70 is coupled to the shaft by a conventional screw-follower mechanism (not shown) rotation of the shaft in either direction produces a corresponding up or down movement of the carriage on the rails. The motor is controlled by computer program which may be preset or programmable, i.e., electronic logic (fixed or programmable) processor to index downward to lower the carriage 70 in increments commensurate with the patty thickness after each horizontal reciprocation of the stacking shoe.

The horizontal reciprocating means comprises a motor platform 78 and a shoe carriage 80, a pair of horizontal guide rails 82,83, screw-drive shaft 84 and motor 86. The stacking shoe 66 is fixedly mounted on the shoe carriage 80, but can be removed to substitute another shoe design to fit another box size. The shoe carriage 80 is coupled to the guide rails by slide bushings such that the carriage 80 can slide horizontally along the rails 82,83. The motor 86, preferably a controllable electric motor (as defined above), is connected to rotate the screw-drive shaft 84. The shoe carriage 80 is coupled to the shaft 84 by a conventional screw-follower mechanism (not shown) such that rotation of the shaft in either direction produces a corresponding in or out movement of the carriage 80 on the rails. The motor 86 is controlled by electronic logic (fixed or programmable) processor to rapidly extend the shoe carrier toward the discharge end of the conveyor after each vertical indexing, and then withdraw it from the conveyor at a rate commensurate with the rate of movement of the patty layers, such that each layer is deposited into the shoe in substantially the same uniform 3×4 spacing as it departed the gate.

The inverting means comprises a fixed bar 88 attached between the two sides of the vertical carriage 70. The bar 88 does not rotate with the shoe; instead it acts as a pivot axis around which the motor carriage 78 and shoe platform 80 are rotated. Two eccentric arms 90 connect the motor platform 78 to the bar 88 and are attached to the bar by bearings such that the arms 90 are free to rotate around the bar. Such rotation is controlled by a rotation wheel 92 driven by a drive belt 94 from a motor 96 mounted on the platform 78. The motor is controlled by electronic logic (fixed or programmable) processor to run in one direction when the stacking shoe is filled and a packing container is placed over the shoe, such that the belt 94 drives the wheel 92 to rotate (counterclockwise) and thus rotate the platform 78 and its attached structure 180 degrees around the axis of the bar 88. This rotation inverts the stacking shoe/container to invert and deposit the stacked patties in the now upright packing container. The motor 96 is then controlled to run in the opposite direction to withdraw the shoe from the container and return it to its beginning orientation facing the discharge end of the conveyor 48. The weight of the patties keeps them in the container in the same 12×3×4 stack when the shoe is withdrawn.

Figure 8:
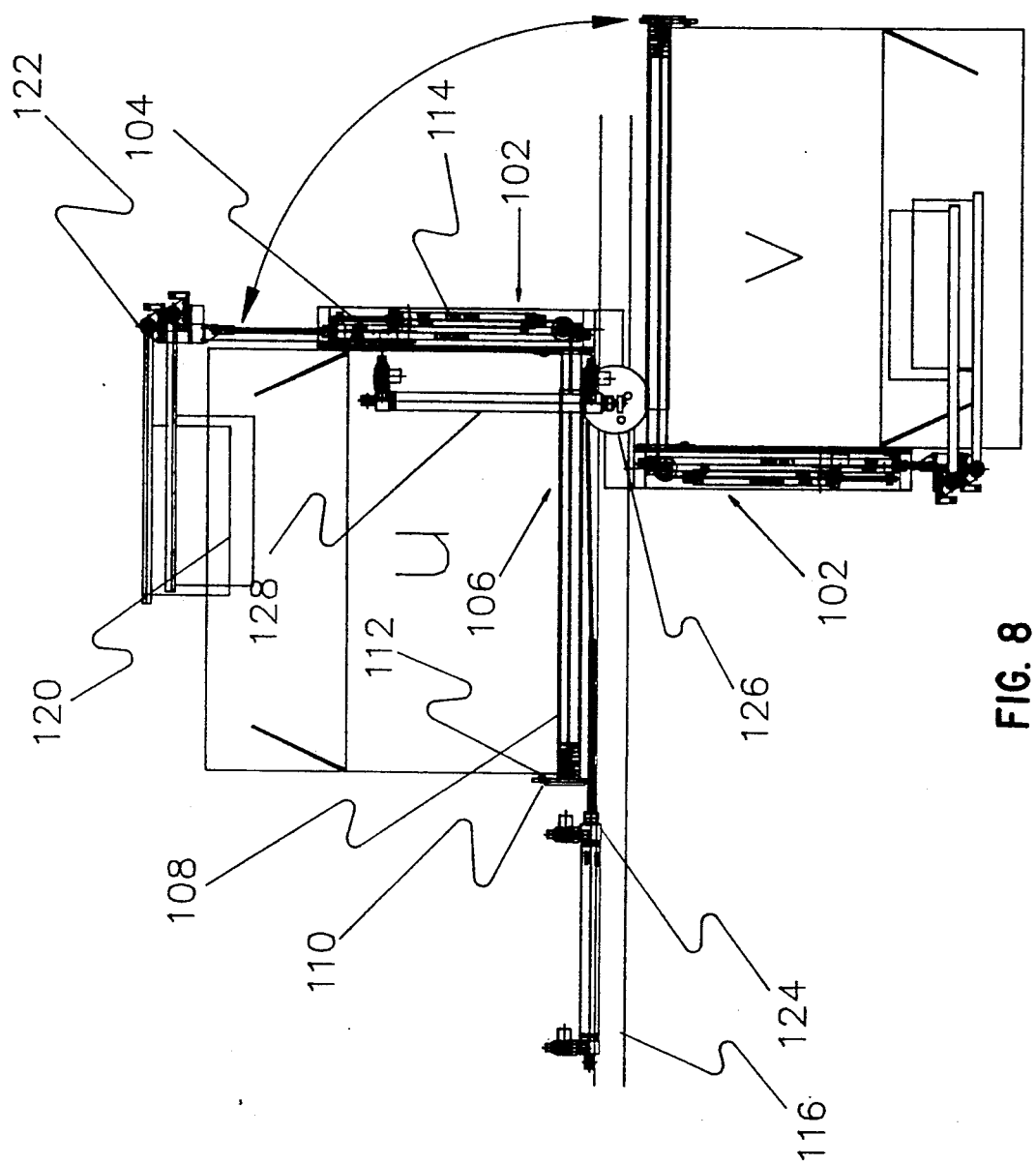
FIG. 8 is an enlarged elevation of a portion of the apparatus.

Referring to FIG. 8, the means for lowering an open box over the filled shoe comprises a flat support plate beneath the box forming part of an "L" shaped, pivoted support frame designated generally 102, double acting pneumatic cylinder means 104, and a pair of extendable grippers 106. The grippers 106 include a telescoping cylinder arm 108 with a gripping flange 110 at its extendable end and at a right angle to the arm 108. The flange 110 has a pair of short gripping points 112 to indent into the cardboard of the container. The arm may be extended and retracted by any suitable means, such as a coil spring inside the hollow arm pushing the telescoping ends apart and a draw cord inside the coil connected to a pneumatic cylinder means 114 to pull the ends toward each other.

Figure 9:
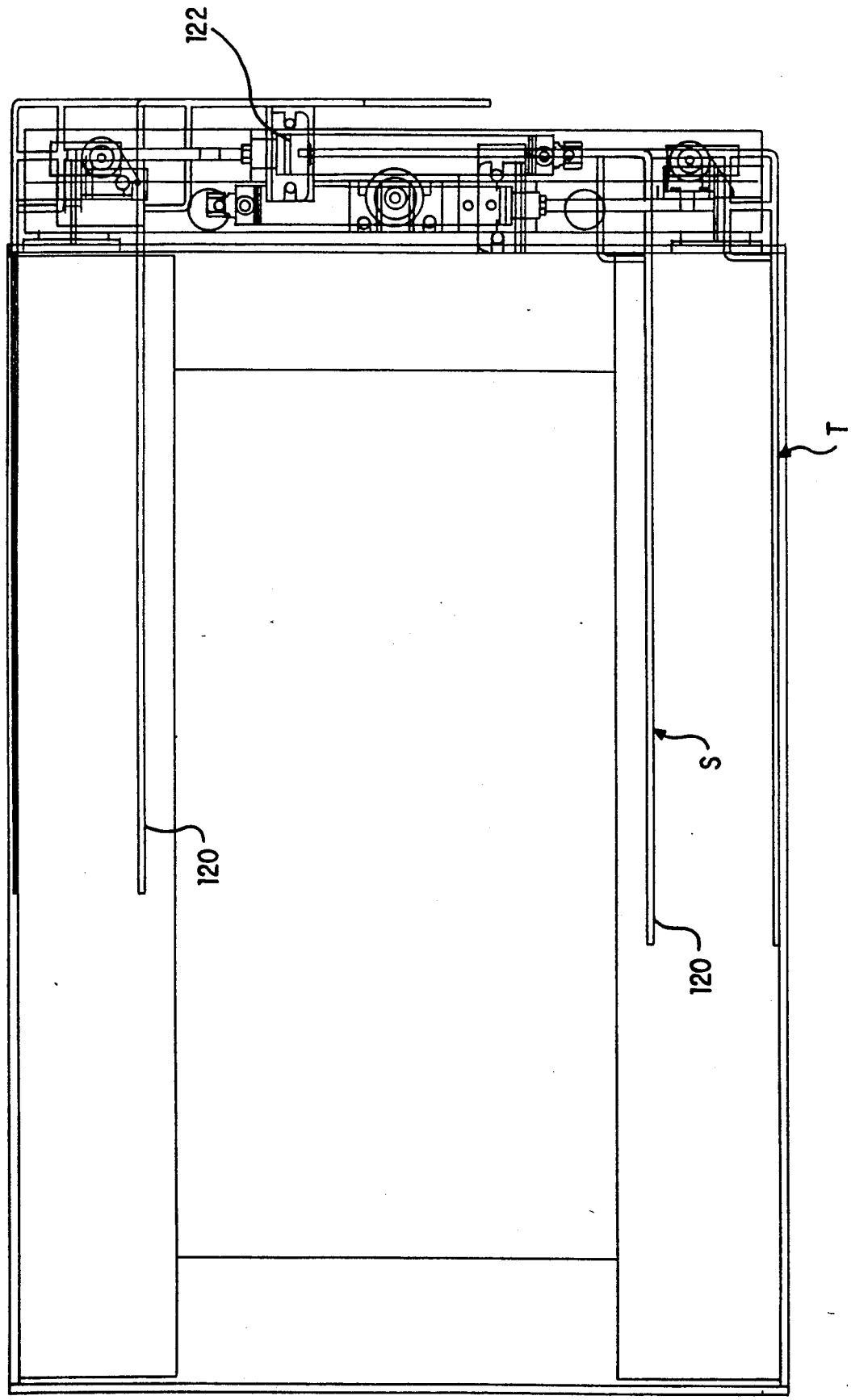
FIG. 9 is a plan view of a portion of the apparatus shown in FIG. 8.

Cardboard packing containers may be brought to packing module 20 by any suitable carrier, such as a conveyor 116, and are picked off the carrier and inserted over the filled stacking shoe. The container is picked off the carrier by the support plate and grippers in the following manner; the carrier deposits the container centered longitudinally on the support plate, with the cylinder arms of the grippers extending under the container outboard of the support plate. The grippers then contract, causing the flange and gripping points to pull the box in against the other leg of the "L" shaped pivotable support frame. A pair of lid-spreader arms 120 are positioned above the opened flaps of the box. The double acting cylinder means 104 lowers these into the opened end of the box which, in the usual configuration, contains a bag deposited within the bottom of the box and extending upwardly and outwardly and being draped over the flaps of the box, so that the gripper arms 120 are inserted into the plastic bag in a first position shown in FIG. 9 at S. A transversely disposed double acting cylinder means designated 122 FIG. 9 is then activated to drive the gripper arms apart to the second position designated T in FIG. 9 thereby spreading the box and bag open. With the box thus held, another double acting cylinder means 124 FIG. 8 connected to the "L" shaped support is activated to extend outwardly and pivot the support from the position shown and designated a first position U in FIG. 8 to the inverted position shown, and designated a second position V in FIG. 8 about a center of rotation designated generally 126.

From this position, the entire "L" shaped support frame is lowered by means of a further pneumatic double acting cylinder (shown schematically and designated generally 128 in FIG. 8) which is connected by any suitable means (not shown) to the frame 102. The lowering continues until the open flaps of the box and the entire box envelope the shoe 66. It is noteworthy that uninterrupted space must be provided below the shoe along its sides so that the flaps of the box have room when the box is seated on top of the shoe; i.e., when the top of the shoe is inserted so that it touches the inside of the bottom of the box. Additional uninterrupted space must be provided for the next step. This comprises releasing the clamps 106 and 120; extending the grippers 120 to a position beyond interference with the downwardly depending flaps of the box; moving the grippers 120 laterally so that they are outside of interference with the flaps of the box and can be raised past the outer periphery of the box; and then raising the entire "L" shaped support structure to a position where it can be rotated without interfering with the box. The "L" shaped structure is raised to the position and then rotated back to the first position as shown in FIG. 8 for reception of an additional box.

Figure 10:
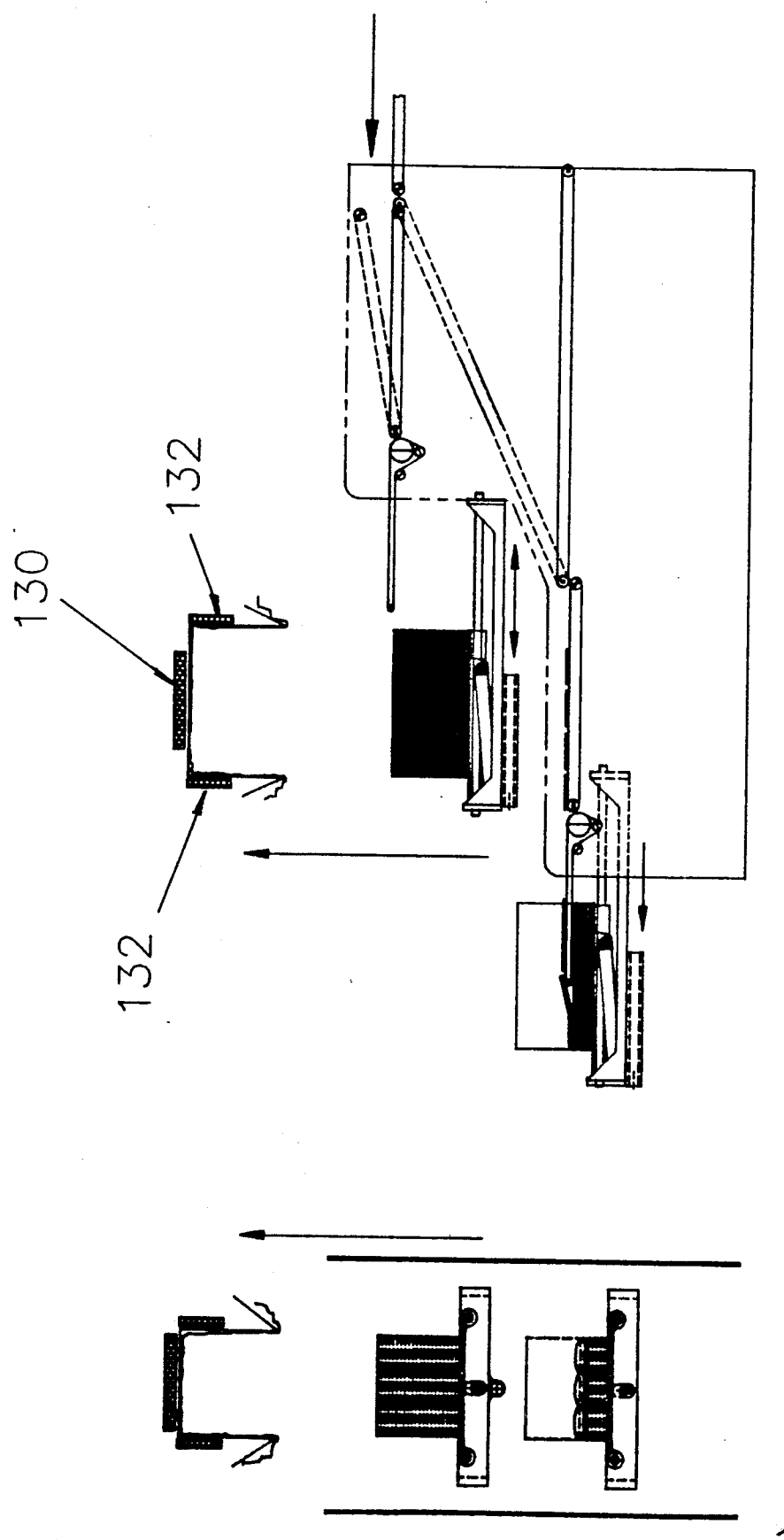
FIG. 10 is a schematic elevation of an alternative station in the apparatus unit FIG. 2.

As shown in FIG. 10, a vacuum powered means may also be applied or alternatively applied to the box for retaining the liner and maintaining the box geometry as well as lifting and lowering it. In this schematic representation, the vacuum means designated generally 130 applies a vacuum through the bottom of a box in the hole between the flaps which are glued together. This draws the bottom of the bag tightly against the inside of the bottom of the inverted container. Additional vacuum means 132 are applied to the side of the box to both grip it and maintain its geometry while it is inverted and inserted over the shoe containing the stacked patties.

Figure 11:
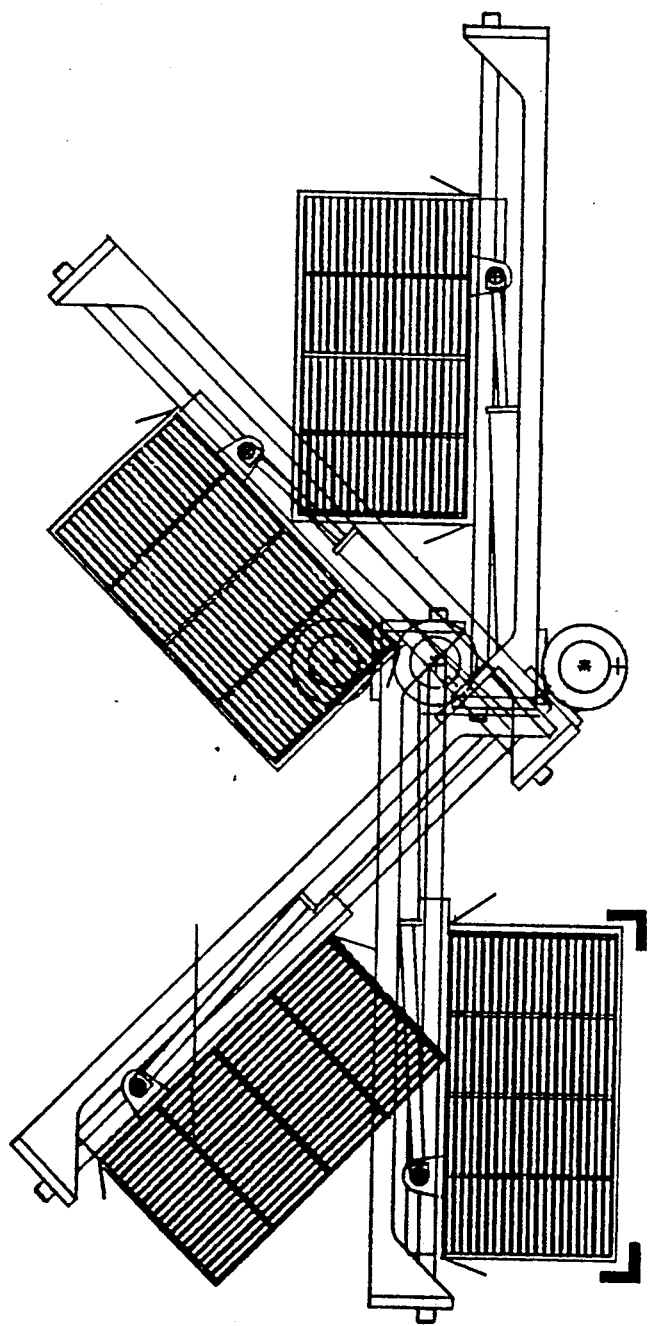
FIG. 11 is a schematic representation of alternate positions of a portion of the apparatus shown in FIG. 2

A clamp (not shown) is applied to the bottom of the box when it embraces the shoe, so that as the box is rotated to the discharge position as shown by the steps indicated graphically in FIG. 11, the box will be pressed against the shoe and the contents of the shoe and box will be rotated as a unit as clearly illustrated in the figure. Once the 180° rotation is accomplished, the frame which holds the shoe can be rotated back to its original position leaving the open box with the open side up ready for sealing and storage.

It should be understood that throughout this equipment diagnostic programming and optical limit switches, as are well known in the machinery art, can and should be applied to know and sense for horizontal, vertical and rotational and reciprocation positions. Most preferably, they should have a "home" position for locating the start of each cycle in the same spot after each sequence.

SEQUENCE OF OPERATION

In operation, the method in accordance with the preferred embodiment of this invention functions as follows. The product, in this case, frozen hamburger patties, made from a material of relatively uniform density and formed in substantially uniform sizes and shapes, is discharged onto a conveyor and sensed for foreign objects such as metal and for uniformity as to size, shape, thickness and weight. Thereafter, if necessary, some number of patties are rejected, either for impurities, in which case they go to one sorting container; or because they are badly formed, or under or over predetermined weight limits, in which case they go to another sorting container. Thereafter, the product is accumulated and rearranged by orientation and/or numbers to a row and rows to a group. When a required number is achieved, they are released and deposited in a layer. Subsequently, a layer is deposited on top of the first layer, until the desired number in a stack of layers is obtained. The product is next boxed automatically, and the boxes are sealed and transported for further inventorying.

Significantly, this is a non-stop operation which can run with either two or four stations thereby permitting use of the state-of-the art equipment for producing hamburger patties. Because of the weigh station, the finished package of product needs no adjustment for weight.

The operation is completely automatic from start to finish, so that there is no repetitive hand or arm activity on the part of any human operator. This is an important consideration, particularly in the meat packaging industry, where such operations on a repetitive basis over a number of years can cause physical disabilities.

While what I have described is specific to the preferred embodiment of this invention, it will be understood that various changes may be made within the scope and context of the invention as described, shown in the drawings and claimed.

I claim:

1. A method of stacking and packaging substantially flat disks into containers holding H layers of disks, each layer having W columns and D rows of discs (wherein H, W & D are integers), comprising the steps of:

(a) Conveying the disks along a conveyor from a disk source to a stacking shoe;

(b) Automatically arranging the discs along the conveyor and arresting and grouping them into substantially uniformly spaced and numerically equivalent layers of W disk columns across the conveyor, and D disk rows along the conveyor;

(c) Releasing each layer when it is complete;

(d) Conveying each layer into a stacking shoe comprising a bottom plate and side walls having the approximate dimensions and shape of the interior of a container except for an open side oriented toward a discharge end of the conveyor to receive the disks from the conveyor;

(e) Moving said shoe toward the discharge end of the conveyor and reciprocally withdrawing it so that the layer is deposited into the shoe in substantially the same uniform spacing in which discs were grouped in the layer;

(f) Vertically indexing the shoe in relation to the discharge of the layers so that the next layer is discharged directly on top of the immediately preceding layer until H numbers of layers are stacked in the shoe;

(g) Lowering an open ended container over the shoe such that the shoe is inserted into the container;

(h) Inverting the stacking shoe and container to invert the stack of disks in the shoe and deposit it onto a conveyor; and (i) Withdrawing the shoe from the container and returning it to its aforesaid orientation prior to movement toward said discharge end.

2. An apparatus for stacking and packaging substantially flat discs of relatively uniform thickness into containers holding H layers of discs, each layer having W columns and D rows of discs (wherein H, W and D are integers), comprising:

a conveyor means for carrying the discs from a disc source to a stacking shoe, a layer-forming gate means located along the conveyor, said gate means adapted to arrest and group discs into uniformly spaced and numerically equivalent layers, each layer being of W disc columns across the conveyor and D disc rows along the conveyor, and to release each layer when it is complete to travel along the conveyor to a stacking shoe, a stacking shoe comprising a bottom plate and side walls having the approximate dimensions and shape of the interior of the containers except for an open side oriented toward a discharge end of the conveyor to receive discs discharged from the conveyor, reciprocating means adapted to move the shoe toward the discharge end of the conveyor such that the discharge end enters the open side of the shoe and overlies the bottom plate adjacent the wall opposite the open side, and to withdraw the shoe from the discharge end at a rate commensurate with the rate of travel of the disc layer from the discharge end, such that each layer is deposited into the shoe in substantially the same uniform spacing in which they were grouped, vertical indexing means adapted to lower the shoe in relation to the discharge end of the conveyor in increments commensurate with the thickness of the discs after each reciprocation of the shoe, such that each layer after the first is discharged from the conveyor directly on top of the immediately preceding layer until H number of layers are stacked in the shoe, means for lowering an open-ended container over the shoe such that the shoe is inserted into the container, and means for inverting the stacking shoe and container to invert the stack of discs in the shoe and deposit it into the container, and to then withdraw the shoe from the container and return it to its aforesaid orientation prior to movement toward the discharge end of the conveyor.

3. The invention of claim 2 wherein the apparatus further comprises a sensor means for determining the weight of a given disc based upon the density of the material forming the disc.

4. The invention of claim 3 wherein the sensor means is an imaging device utilizing a plurality of optical sensors.

5. The invention of claim 4 wherein the optical sensors are arrayed in a matrix which senses the shape and size of a given disc.

6. The invention of claim 3 wherein reject means are provided downstream in the line of travel of the discs along the conveyor from the sensor means to reject discs based on any of the following criteria: size, shape, weight.

7. The invention of claim 6 wherein a metal detector is provided to detect metals within the discs and a deflector means is provided for deflecting rejected discs which have been rejected due to metal into one container and deflecting discs which have been rejected for other reasons into another container.

8. The invention of claim 2 wherein the layer-forming gate means is a light weight module resting above the conveyor and readily detachably electrically connected to the apparatus whereby it may be readily interchanged with a layer-forming gate means of a different configuration.

9. The invention of claim 2 wherein the means for lowering an open-ended container comprises means for gripping the container, means for holding the container open and means for inverting the container prior to inserting the shoe into it.

10. The invention of claim 9 wherein the means for holding the container open also provides a means for holding a loose liner within the container prior to insertion of the shoe into the container.

11. The invention of claim 10 wherein vacuum means are provided to retain the liner within the container prior to and during the insertion of the shoe into the container.

12. The invention of claim 10 wherein vacuum means are provided to substantially maintain the geometry of the container prior to insertion of the shoe into it.

13. The invention of claim 9 wherein means are provided to release the means which hold the container open and remove said means prior to inverting the container with the shoe of discs in it.

14. The invention of claim 3 wherein the sensor means does not contact the disc.

15. The invention of claim 2 wherein said layer-forming gate means comprises a frame extending above and across the conveyor, said frame having partition walls dividing said discs into rows as they move along said conveyor; means associated with said frame for selectively inhibiting discs from moving or permitting discs to move along said conveyor; and means for identifying the discs that are positioned in place within said frame.

16. The invention of claim 15 wherein the means for selectively inhibiting and permitting disc movement and the means for identifying discs, comprise a plurality of pins extending from the frame above the conveyor to alternatively contact the discs.

17. The invention of claim 16 wherein said plurality of pins comprises at least one pin positioned at the down stream end of the frame in the direction of movement of discs on a conveyor to initially inhibit the progressive movement of the discs which first arrive in each column beneath the frame to begin to form a layer; a plurality of movable fingers attached to said frame and positioned to engage each of the discs being grouped by said frame and configured so that one of such fingers engages one of such discs within said frame and is pivoted by said disc as it moves with the conveyor to a position to permit said disc to continue to move with said conveyor as part of said layer of grouped discs; and electrical switch means associated with said frame and said movable fingers to switch from a first position, prior to engagement with said disc, to a second position upon pivoting of said finger; and means associated with said switches and said pins to move said pins to a position permitting release of each layer when it is complete.

* * * * *